US012205814B2

(12) United States Patent
Köster

(10) Patent No.: US 12,205,814 B2
(45) Date of Patent: Jan. 21, 2025

(54) TIME-OF-FLIGHT MASS SPECTROMETER WITH MULTIPLE REFLECTION

(71) Applicant: Bruker Daltonics GmbH & Co. KG, Bremen (DE)

(72) Inventor: Claus Köster, Bayreuth (DE)

( * ) Notice: Subject to any disclaimer, the term of this patent is extended or adjusted under 35 U.S.C. 154(b) by 305 days.

(21) Appl. No.: 17/932,884

(22) Filed: Sep. 16, 2022

(65) Prior Publication Data

US 2023/0096197 A1 Mar. 30, 2023

(30) Foreign Application Priority Data

Sep. 27, 2021 (DE) ............................ 102021124972

(51) Int. Cl.
*H01J 49/40* (2006.01)
*H01J 49/06* (2006.01)
*H01J 49/00* (2006.01)

(52) U.S. Cl.
CPC .......... *H01J 49/403* (2013.01); *H01J 49/063* (2013.01); *H01J 49/406* (2013.01); *H01J 49/0086* (2013.01)

(58) Field of Classification Search
CPC ...... H01J 49/063; H01J 49/403; H01J 49/406; H01J 49/0086; H01J 49/42; H01J 49/4225
See application file for complete search history.

(56) References Cited

U.S. PATENT DOCUMENTS

2016/0126083 A1 5/2016 Hoyes
2016/0148795 A1* 5/2016 Köster .................. H01J 49/425 250/287

FOREIGN PATENT DOCUMENTS

| | | | |
|---|---|---|---|
| EP | 2958133 | | 12/2015 |
| KR | 20100108020 | | 10/2010 |
| SU | 1725289 | A | 4/1992 |
| WO | 2005001878 | A2 | 1/2005 |
| WO | 2008047891 | A2 | 4/2008 |

OTHER PUBLICATIONS

Yavor, M. et al., "Planar multi-reflecting time-of-flight mass analyzer with a jig-saw ion path", Physics Procedia 1 (2008) pp. 391-400.
Mamyrin, B.A. et al., "The mass-reflectron, a new nonmagnetic time-of-flight mass spectrometer with high resolution", A.F. Ioffe Pysico-technical Institute, USSR Academy of Sciences, Zh. Eksp. Teor. Fiz. 64 (1973) pp. 82-89.

* cited by examiner

*Primary Examiner* — David E Smith
(74) *Attorney, Agent, or Firm* — BENOIT & COTE INC.

(57) ABSTRACT

The invention provides (a) a time-of-flight mass spectrometer with an acceleration region, a single-stage or multi-stage reflector, and an ion detector, further comprising an additional reflector whose potential has, at least in a subregion, a two-dimensional logarithmic potential component and a two-dimensional octopole potential component, and (b) methods for operating the time-of-flight mass spectrometer.

13 Claims, 9 Drawing Sheets

TIME-OF-FLIGHT MASS SPECTROMETER WITH MULTIPLE REFLECTION

The invention relates to time-of-flight mass spectrometers with reflectors.

PRIOR ART

Time-of-flight mass spectrometers (TOF-MS) with reflectors have been known for a long time and typically comprise a pulsed acceleration region, a field-free flight region, and an ion detector in addition to one or more reflectors.

Ions with the same mass-to-charge ratio (m/z) have different kinetic energies downstream of the acceleration region because of their respective starting positions within the acceleration region, and these different energies lead to a distribution of different times of flight at the ion detector. The width of the time-of-flight distribution can be significantly reduced with the aid of a reflector in which the direction of flight of the ions is reversed by means of static or time-dependent electric fields. The mass resolution of a time-of-flight mass spectrometer with reflector is much higher than that of a simple (so-called linear) time-of-flight mass spectrometer, which comprises only a pulsed acceleration region, a field-free flight region, and an ion detector.

Mamyrin introduced a two-stage reflector (Mamyrin et al., Soy. Phys. JETP, 1973, 37(1), 45-48), which uses two regions (stages) with homogeneous electric fields, and the field strength in the two stages is different. This allows both first-order and second-order energy focusing, i.e., the first two derivatives of the time of flight with respect to the kinetic energy are zero for ions of the same ion species, which are accelerated to different kinetic energies because of their respective starting positions in the acceleration region. Hence, two-stage reflectors are better than single-stage reflectors at compensating for large differences in the kinetic energy. The “classic” Mamyrin reflector contains two conductive grids (two-stage grid reflector), which separate the first stage from an adjacent field-free flight region and the two stages from each other. The electric field of the first stage of a two-stage grid reflector typically has a higher field strength than the electric field of the second stage. The ions pas s through the first stage and are decelerated there, typically losing ⅔ or more of their kinetic energy before arriving at the second stage. The direction of flight of the ions is reversed in the second stage so that they pass through the first stage for a second time, but in the opposite direction.

The mass resolution in a time-of-flight mass spectrometer with two-stage grid reflector is limited by the order of the energy focusing, the reversal or “turn-around” time due to the initial thermal energy distribution of the ions in the acceleration region (and thus also by the field strength during acceleration), and the scattering of the ions at the grids. The ion scattering and the ion losses at the grids, in particular, make the use of grid reflectors with three or more stages impractical.

Two-stage reflectors are typically used in time-of-flight mass spectrometers with orthogonal ion injection (OTOF-MS). FIG. 1 shows a schematic representation of an OTOF-MS with a two-stage grid reflector, as known from the Prior Art.

Ions are generated at atmospheric pressure in an ion source (1) by means of an electrospray device (2), and introduced into the vacuum system of the OTOF-MS through a transfer capillary (3). The OTOF-MS is evacuated by the pumps (17).

A radio-frequency (RF) ion funnel (4) guides the ions into a first RF quadrupole rod system (5), which can be operated both as an RF ion guide and also as a quadrupole mass filter for selecting a species of precursor ion for fragmentation. The selected or non-selected ions are fed continuously through the ring diaphragm (6) and into a gas-filled linear RF quadrupole ion trap (7), and selected precursor ions can be fragmented by means of sufficiently energetic collisions with the gas components.

The RF quadrupole ion trap (7) has an almost gastight casing and is charged with collision gas through the gas feeder (8). The fragment ions or non-fragmented precursor ions are thermalized by collisions with the gas components, focused on the axis by the quadrupole field, and extracted by a switchable extraction lens (9) at the exit of the RF quadrupole ion trap (7), while also being formed into a fine primary ion beam (11) with the aid of the Einzel lens (10) and transferred to the acceleration region (12).

The acceleration region (12) periodically pulses out a section of the primary ion beam (11) orthogonally into the field-free flight region (13). The ions that have been pulsed out pass through the mass dispersive part of the OTOF-MS on an ion trajectory (14), and are deflected and temporally focused in a two-stage grid reflector (15) before being detected at the ion detector (16). The two-stage grid reflector (15) has two grids (18) and (19), which enclose a first strong deceleration field, followed by a weaker reflection field. The different kinetic energies after the acceleration region mean that the string-shaped bunches of ions broaden out up until they enter the two-stage grid reflector (15), but become temporally focused again by the energy focusing by the time they reach the ion detector (16).

Time-of-flight mass spectrometers with two reflectors which reflect the ions back and forth several times are known from the Prior Art: unexamined laid-open patent application SU1725289A1 by Nazarenko et al.; article by Yavor et al., Physics Procedia 1, 2008, 391-400 (“Planar multi-reflecting time-of-flight mass analyzer with a jig-saw ion path”); unexamined laid-open patent application WO 2005/001878 A2 by Verentchikov et al.; unexamined laid-open patent application WO 2008/047891 A2 by Sudakow.

These time-of-flight mass spectrometers with multiple reflections typically have two grid-less reflectors, which are both elongated in the same direction (direction of elongation) and are arranged parallel to each other. A field-free flight region through which the ions pass several times is located between the two reflectors. The ions are introduced into an acceleration region along the direction of elongation with low energies of only a few tens of electronvolts and pulsed out there orthogonally toward one of the two reflectors (direction of reflection) with high acceleration voltages of 5 to 30 kilovolts, while their speed in the direction of elongation is maintained. The ions then fly back and forth in a zigzag movement between the two reflectors and, in doing so, move in the direction of elongation from the acceleration region to an ion detector. The two reflectors each consist of pairs of plate electrodes, which are arranged opposite each other and elongated along the direction of elongation and also along the direction of reflection. In the reflectors, ions of the same mass m/z are energy-focused and time-of-flight focused and, in addition, directionally focused in the direction perpendicular to the directions of elongation and reflection. Time-of-flight mass spectrometers with multiple reflections have the advantage over time-of-flight mass spectrometers with only one reflector that their folded ion trajectories facilitate long times of flight at high accelerating voltages, and also that their dimensions are relatively small.

However, there is still a need to improve the mass resolution of time-of-flight mass spectrometers without increasing the times of flight which are currently usual for time-of-flight mass spectrometers with a two-stage grid reflector, or to reduce their dimensions while keeping the mass resolution and time of flight the same.

SUMMARY OF THE INVENTION

The invention provides a time-of-flight mass spectrometer with an acceleration region, a single-stage or multi-stage reflector, and an ion detector, and further comprises an additional reflector, whose potential has, at least in a sub-region, a two-dimensional logarithmic potential component and a two-dimensional octopole potential component. Each stage of the single-stage or multi-stage reflector essentially has a linear reflection potential. The single-stage or multi-stage reflector is preferably a two-stage grid reflector.

When "two-dimensional potentials" are mentioned here, this means that a potential distribution that is defined in two dimensions (usually the x-direction and y-direction) continues unchanged in the third dimension (usually the z-direction), at least over a certain length. The acceleration region, the two reflectors, and the ion detector are arranged in the x-z plane and preferably centered along the y-direction. The ions are accelerated and reflected along the x-direction. The potential of the additional reflector is essentially constant along the z-direction where ions pass through the additional reflector. It also has a local minimum along the x-direction (direction of reflection), i.e., the ions are first accelerated on entering the additional reflector and decelerated only afterward, and can have a point of inflection, particularly after the local minimum. The potential of the additional reflector can be designed such that the spatial spread of the ions and their divergence in the y-direction on entering and exiting is essentially the same, or that spatial focusing or parallelization of a divergent ion beam is achieved in the y-direction.

The two-dimensional logarithmic potential component $U_{log}$ ($\Delta$x, $\Delta$y) is given by:

$$U_{log}(\Delta x, \Delta y) = U_l \log\left[\frac{(\Delta x^2 + \Delta y^2)^2 - 2b^2(\Delta y^2 - \Delta x^2) + b^4}{a^4}\right]$$

where $\Delta$x and $\Delta$y are relative coordinates in the reflector, $U_1$ defines the strength of the logarithmic potential component of the reflector potential, and a and b are constants of the two-dimensional logarithmic potential. The geometric constant b is preferably between 10 and 70 millimeters, in particular around 35 millimeters, but can also be greater than 70 millimeters.

The two-dimensional octopole potential component $U_{oct}$ ($\Delta$x, $\Delta$y) is given by $$U_{oct}(\Delta x, \Delta y) = U_o\left(\frac{\Delta x^4 - 6\Delta x^2\Delta y^2 + \Delta y^4}{r^4}\right)$$

where $\Delta$x and $\Delta$y are relative coordinates in the reflector, $U_o$ defines the strength of the octopole potential component of the reflector potential, and r is a constant of the octopole potential. The geometric constant is preferably between 30 millimeters and 1,600 millimeters. The relative coordinates of the two-dimensional logarithmic potential component and the two-dimensional octopole potential component are preferably identical, but can have an offset especially along the x-direction.

Especially where ions pass through the reflector, the potential of the additional reflector is essentially (by more than 50%, >60%, >70%, >80%, preferably more than 90%) a superposition of the two-dimensional logarithmic potential component and the two-dimensional octopole potential component. This region can be restricted to a specific distance perpendicular to the x-z plane and/or to an interval in the reflector along the x-direction. The distance to the x-z plane can be less than b/10 or b/20, for example. The ratio $U_o/U_1$ is preferably between 5 and 20.

The acceleration region, a two-stage grid reflector, the additional reflector, and the ion detector are preferably arranged and set up such that ions accelerated in the acceleration region pass through each of the two reflectors only once before being detected at the ion detector. The sequence of the two reflectors along the ion trajectory is arbitrary. It is preferable for a section of the field-free flight region to be located between each of the following: between the acceleration region and the first reflector the ions pass through, between the two reflectors, and between the last reflector the ions pass through and the ion detector. The acceleration region, the two-stage grid reflector, the additional reflector, and the ion detector can also be arranged and set up such that the accelerated ions pass through the two-stage grid reflector only once and through the additional reflector twice.

The additional reflector is at least 0.2 meters long in the reflection direction, preferably between 0.3 and 1.2 meters long. The two-stage grid reflector is at least 0.2 meters long in the reflection direction, preferably between 0.2 and 1.0 meter long. The overall length of the field-free flight region is preferably between 1 and 4 meters, and is preferably between 2 and 8 times as long as the two reflectors together in the reflection direction, in particular at least 4 times as long.

The additional reflector preferably has two inner electrodes at an attractive potential and a plurality of outer electrodes, with the inner electrodes being arranged parallel to the z-direction and above and below the x-z plane with a cross-sectional shape that can be convex toward the x-z plane. The distance between the two inner electrodes and an adjacent field-free flight region is smaller than the distance between the two inner electrodes and a terminating electrode, which delimits the reflector in the reflection direction to the rear. The cross-section and the separation of the two inner electrodes of a reflector can correspond to a Cassini curve $(\Delta x^2+\Delta^2)^2-2b^2(\Delta y^2-\Delta x^2)+b^4=a^4$, where $\Delta$x and $\Delta$y are the relative coordinates in the reflector, a/b<1, and 2·b is the separation of the inner electrodes. The cross-section of the inner electrodes can also be circular or elliptical, however, with the cross-section and the position of the circle or the ellipse preferably being selected such that a Cassini curve is approximated. The number of outer electrodes is preferably greater than 10, particularly between 16 and 30, with usually half of the outer electrodes being arranged above the x-z plane and the other half below the x-z plane. The outer electrodes that are positioned between the two inner electrodes and the terminating electrode have a continuously increasing reflection potential. Outer electrodes can be positioned between the two inner electrodes and an adjacent field-free flight region, said outer electrodes being at the electric potentials which attract the ions, as are the inner electrodes, but which are less attractive than the potential of the inner electrodes.

The additional reflector can have a shielding electrode at its entrance, said electrode having a slit-shaped opening along the z-direction and shielding the electric field of the reflector from an adjacent field-free flight region. The shielding electrode can, particularly, be shaped like the equipotential surface of the reflector potential at the slit-shaped opening. It is preferable that the additional reflector does not have a grid at the entrance (gridless additional reflector) so that the ion losses of the time-of-flight mass spectrometer according to the invention correspond to those of a conventional time-of-flight mass spectrometer with a single-stage or two-stage grid reflector. The shielding electrode can enclose the two inner electrodes, the outer electrodes, and the terminating electrode of the additional reflector.

The time-of-flight mass spectrometer preferably has, in addition, a device located upstream of the acceleration region and set up such that ions are transferred into the acceleration region along the z-direction (perpendicular to the acceleration region, orthogonal ion injection). The accelerating voltage in the z-direction is typically between 5 and 40 volts. The device upstream of the acceleration region can be a (mass-selective) RF ion trap, an RF ion guide, a fragmentation cell, or a mobility separator, for example. The accelerating voltage in the x-direction is typically between 2 and 40 kilovolts.

The acceleration region can, however, also include an RF ion trap or a (desorbing) ion source, such as a MALDI or SIMS ion source (MALDI=matrix assisted laser desorption/ionization, SIMS=secondary-ion mass spectrometry). If ions are stored temporarily in the RF ion trap of the acceleration region before being accelerated, or are only generated there (axial ion injection), the ions can acquire a transverse acceleration in the z-direction, namely in the acceleration region itself or in a downstream device. The accelerating voltage in the x-direction is typically between 2 and 40 kilovolts, as is the case with orthogonal ion injection.

The invention furthermore provides a method for the operation of a time-of-flight mass spectrometer according to the invention. Ions are accelerated in an acceleration region, pass through a first reflector after a first field-free flight region, pass through a second reflector after a second field-free flight region, and are detected in an ion detector after a third field-free flight region. One of the two reflectors is a single-stage or two-stage (grid) reflector and the other is a reflector whose potential has, at least in a subregion, a two-dimensional logarithmic potential component and an octopole potential component. The ions preferably pass through the reflectors only once.

The ions are accelerated in the acceleration region preferably by means of an accelerating voltage of between 2 and 40 kilovolts. The geometric dimensions of the flight region and the reflectors as well as the accelerating voltage are preferably designed such that the time of flight of the ions up to the ion detector (especially in the mass range up to 3,000 atomic mass units) is preferably shorter than 400 microseconds, most preferably shorter than 200 microseconds, and particularly around 100 microseconds, i.e., such that the acquisition rate is preferably at least 2,500 and in particular around 10,000 spectra per second.

The ions are preferably generated outside the acceleration region and introduced into the acceleration region perpendicular to the acceleration direction (orthogonal ion injection), which means the ions already have a velocity component perpendicular to the acceleration direction during the acceleration.

The ions can also be generated outside the acceleration region and temporarily stored in the acceleration region before the acceleration (axial ion injection), with a further velocity component perpendicular to the acceleration direction being imparted to the ions in the acceleration region or downstream thereof. The ions can, however, also be generated only in the acceleration region (e.g., by means of a MALDI or SIMS ion source) and accelerated with a temporal delay if required, with a further velocity component perpendicular to the acceleration direction being imparted to the ions in the acceleration region or downstream thereof.

The ions of one ion species pass through the field-free flight region and the reflectors preferably as a string-shaped ion cloud, and the expansion of the ion cloud in the z-direction, along which the two-dimensional potential components of the additional reflector essentially do not change (direction of invariance), is greater than in the y-direction, i.e., perpendicular to the direction of reflection and invariance.

An advantage of the present invention consists in the fact that it achieves higher-order energy focusing than a time-of-flight mass spectrometer with one or more two-stage grid reflectors, which means a greater mass resolution can be achieved at the same accelerating voltage. This exploits the fact that, for the additional reflector, at least the third-order energy focusing is in the opposite direction to the third order of a two-stage grid reflector that is combined with a field-free flight region.

The present invention allows the commonly used time-of-flight mass spectrometers with orthogonal ion injection, in which ions are reflected once in a two-stage grid reflector, to be modified in such a way that they achieve a significantly higher mass resolution with similar geometric dimensions and times of flight. The additional reflector can particularly be operated without an entrance grid so that the ion transmission in a time-of-flight mass spectrometer according to the invention is not reduced. The spatial beam shaping perpendicular to the direction of reflection, which is enabled by the additional reflector, can be used for maintaining the spatial spread of the ions at the ion detector despite the additional reflector.

Furthermore, the present invention allows the commonly used time-of-flight mass spectrometers with orthogonal ion injection, in which ions are reflected once in a two-stage grid reflector, to be modified in such a way that they can be built with a more compact design for the same mass resolution, since the superior energy focusing allows the overall length of the field-free flight region to be reduced.

An advantage of the time-of-flight mass spectrometer according to the invention also consists in the fact that the potentials in the additional reflector are sufficiently defined by equations, which make it easier to carry out simulations and optimizations based thereon. The time-of-flight mass spectrometers according to the invention are a further development of time-of-flight mass spectrometers which are commonly used commercially, and whose performance is increased significantly by means of simple design measures.

BRIEF DESCRIPTION OF THE ILLUSTRATIONS

Figure 6:
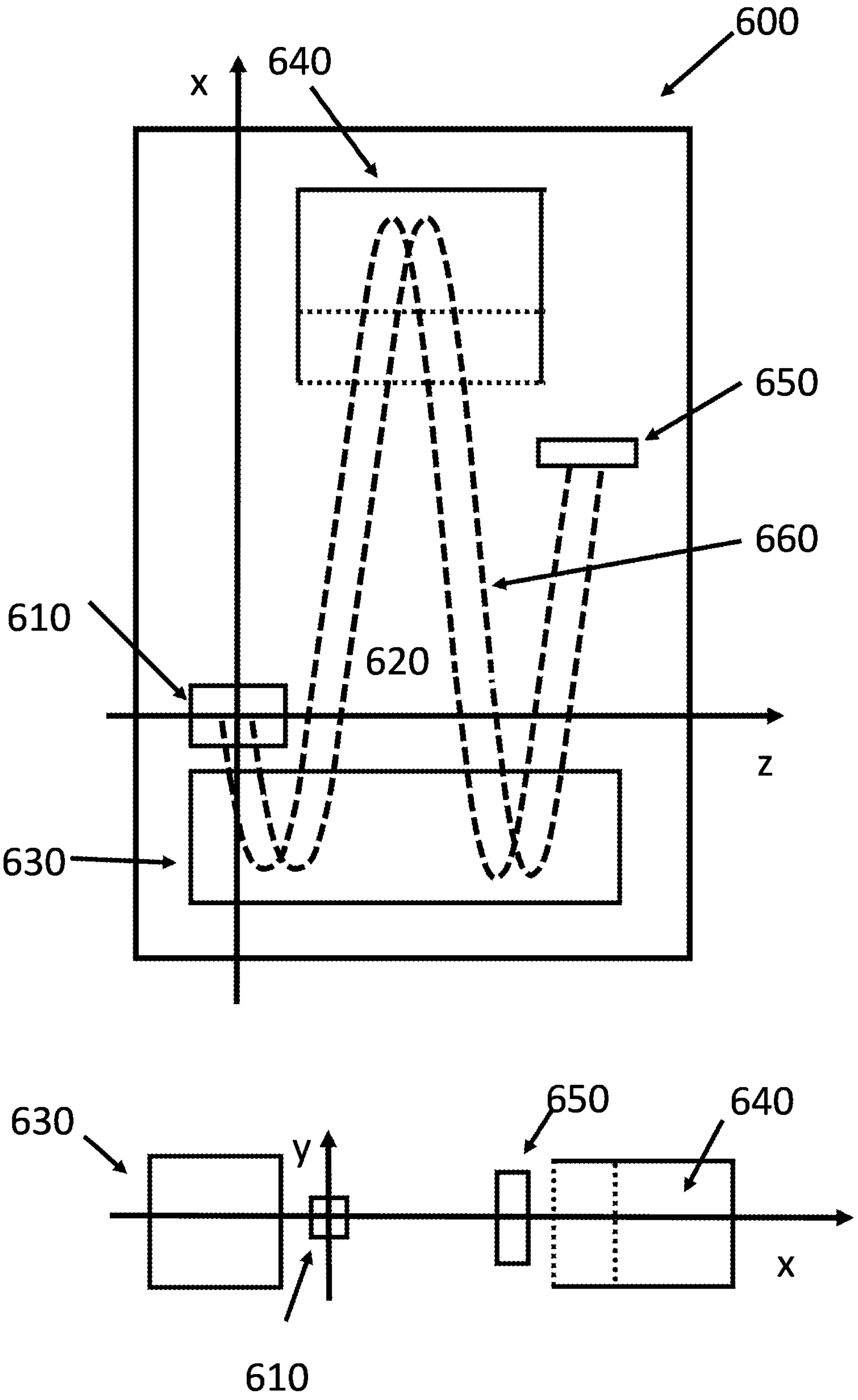

FIG. 6 shows a schematic representation of the mass-dispersive part (600) of a fourth embodiment, which comprises an orthogonal acceleration region (610), a two-stage grid reflector (640), an ion detector (650), and an additional reflector (630) which has a two-dimensional logarithmic and octopole potential component, once in an x-z plane (top), once in an x-y plane (bottom). The additional reflector (630) is elongated in the z-direction compared to the second embodiment, and the accelerated ions pass through it twice so that a W-shaped ion trajectory (660) results.

DETAILED DESCRIPTION

The disclosure can be better understood by referring to the following illustrations. The elements in the illustrations are not necessarily to scale, but are primarily intended to illustrate the principles of the disclosure (mostly schematically).

Figure 2A:
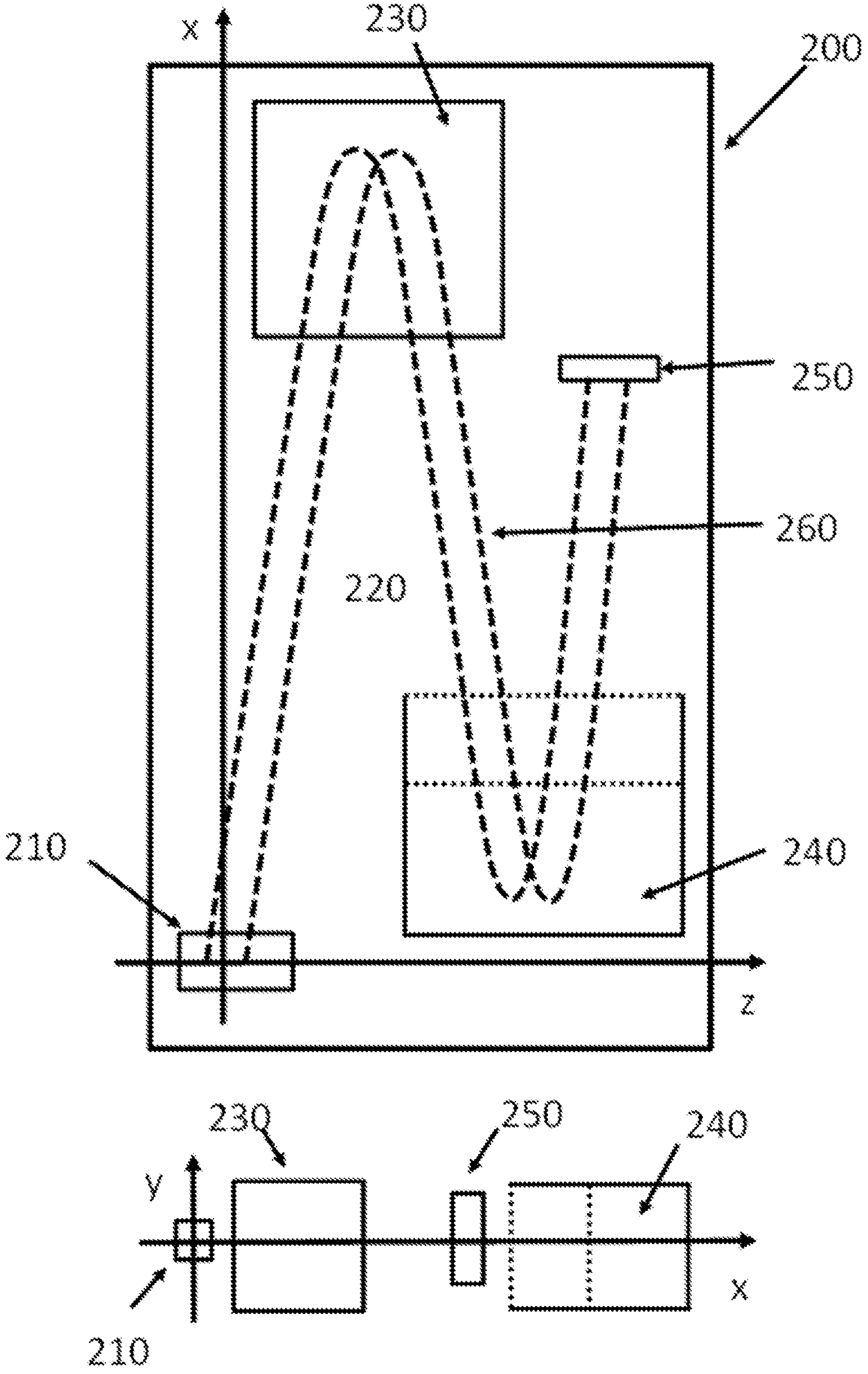
FIG. 2A shows a schematic representation of the mass-dispersive part (200) of a first example embodiment, which comprises an orthogonal acceleration region (210), a two-stage grid reflector (240), an ion detector (250), and an additional reflector (230) with a two-dimensional logarithmic and octopole potential component, once in an x-z plane (top), once in an x-y plane (bottom).

FIG. 2A shows a schematic representation of the mass-dispersive part (200) of a first embodiment, which comprises an orthogonal acceleration region (210), a two-stage grid reflector (240), an ion detector (250), and an additional reflector (230) with a two-dimensional logarithmic and octopole potential component. The top part of the figure shows how the components are arranged in the x-z plane. The bottom part of the figure shows the components in the x-y plane.

Figure 1:
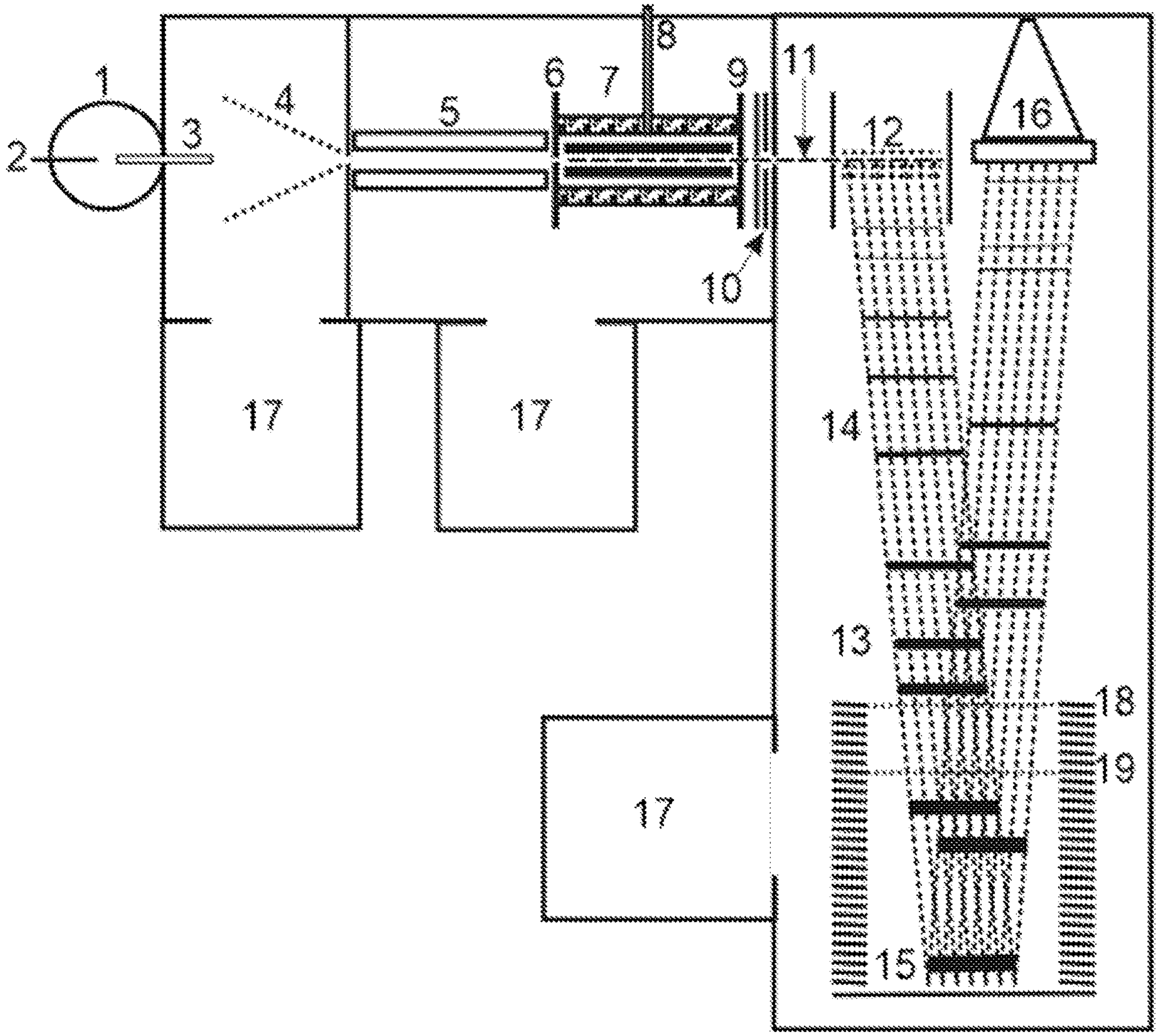
FIG.1 (Prior Art)
FIG. 1 shows a schematic representation of an OTOF-MS with a two-stage grid reflector, as known from the Prior Art.

In contrast to FIG. 1, the first embodiment has an additional reflector (230) in addition to a two-stage grid reflector (240). As already shown in FIG. 1, an ion beam from an upstream device (not shown) with a velocity component in the z-direction is transferred into the acceleration region (210). The acceleration region (210) periodically pulses out a string-shaped section of the ion beam orthogonally into a field-free region (220). The ions which are pulsed out are first deflected in the additional reflector (230) and pass through the field-free region (220) a second time, before their direction is reversed a second time in the two-stage grid reflector (240). After the two-stage grid reflector (240), the ions pass through the field-free region (220) a third time and are detected in the ion detector (250). The ion trajectory (260) in the mass-dispersive part (200) is N-shaped and comprises three field-free subregions.

Figure 2B:
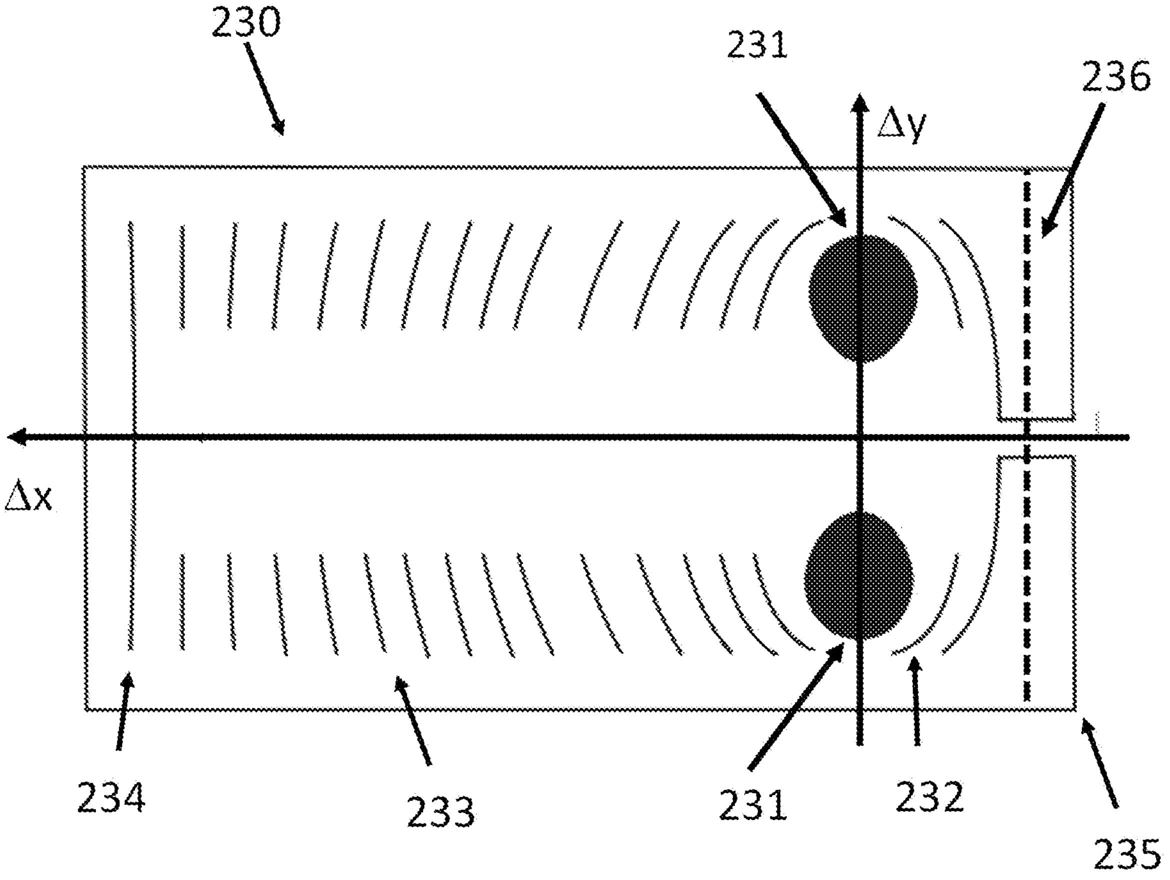
FIG. 2B shows a schematic representation of the additional reflector (230) in the x-y cross-section with the relative coordinates of the additional reflector (230).

FIG. 2B shows a schematic representation of the additional reflector (230) in the x-y cross-section with the relative coordinates of the additional reflector (230). The additional reflector (230) has two inner electrodes (231), a plurality of outer electrodes (232, 233), a terminating electrode (234), and a shielding electrode (235). The electrodes of the additional reflector (231, 232, 233, 234, 235) are arranged in mirror symmetry with respect to the x-z plane.

The cross-sections of the two inner electrodes (231) correspond to a Cassini curve, with a slightly egg-shaped appearance. The inner electrodes (231) are at a potential that attracts the ions. The additional reflector (230) is bounded toward the end by a slightly curved terminating electrode (234), which is at a potential that repels the ions.

The outer electrodes (232, 233) of the additional reflector (230) consist of curved metal sheets which follow the shape of the equipotential surfaces of the reflector potential at their respective positions. The outer electrodes (233) have a continuously increasing potential from the inner electrodes (231) through to the terminating electrode (234). The outer electrodes (232) are at a potential that attracts the ions, as are the two inner electrodes (231), but their potential attracts ions less than the potential of the two inner electrodes (231). The curved outer electrodes (233) become flatter and flatter, following the shape of the equipotential surfaces of the superimposed logarithmic and octopole potential components, until the last outer electrode before the terminating electrode (234) is essentially flat. The last outer electrode is at the potential of the ion beam before the acceleration in the acceleration region (210) so that the points of reversal of the ions are located here.

The shielding electrode (235) has a slit-shaped opening along the z-direction at the entrance of the additional reflector (230), and shields the electric field of the reflector from the adjacent field-free region. The shielding electrode (235) follows the shape of the slit-shaped opening of the equipotential surface of the reflector potential and encloses the two inner electrodes (231), the outer electrodes (232, 233), and the terminating electrode (234). The dashed line (236) marks the transition from the field-free flight region to the reflector potential. The additional reflector (230) has no shielding grid at the entrance, so the ion losses of the time-of-flight mass spectrometer according to the invention essentially correspond to those of the time-of-flight mass spectrometer from FIG. 1.

Figure 2C:
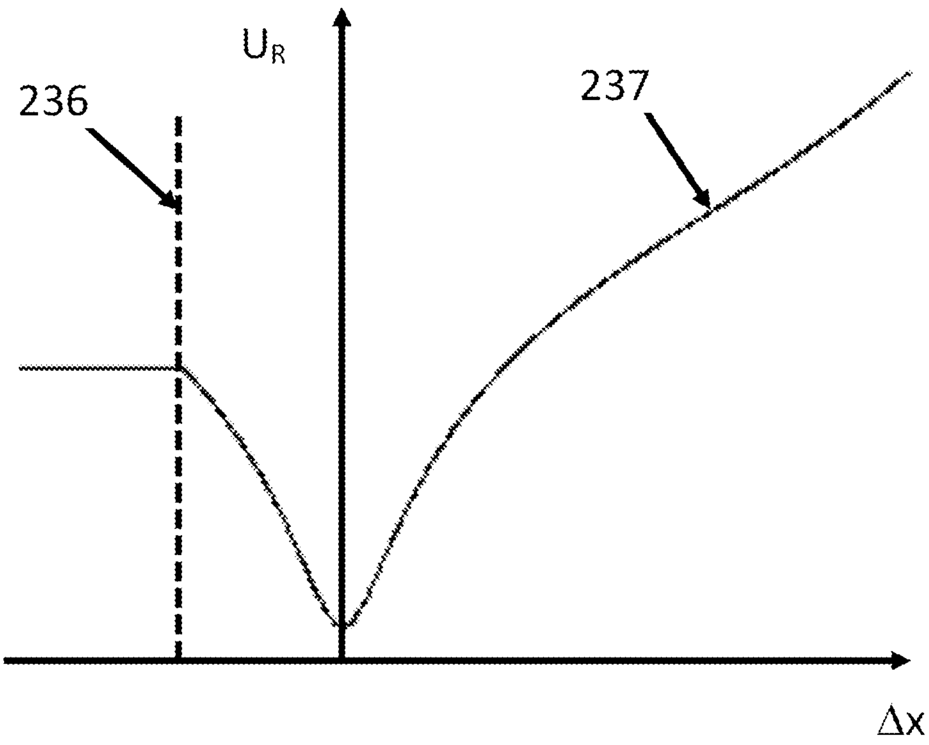
FIG. 2C shows the electric potential of the additional reflector (230) along the direction of reflection.

FIG. 2C shows the electric potential UR of the additional reflector (230) in the x-z plane along the direction of reflection. The dashed line (236) again marks the transition from the field-free flight region to the reflector potential UR. The reflector potential UR has a local minimum at the x-position of the inner electrodes (231) and a point of inflection at the position (237).

Figure 3A:
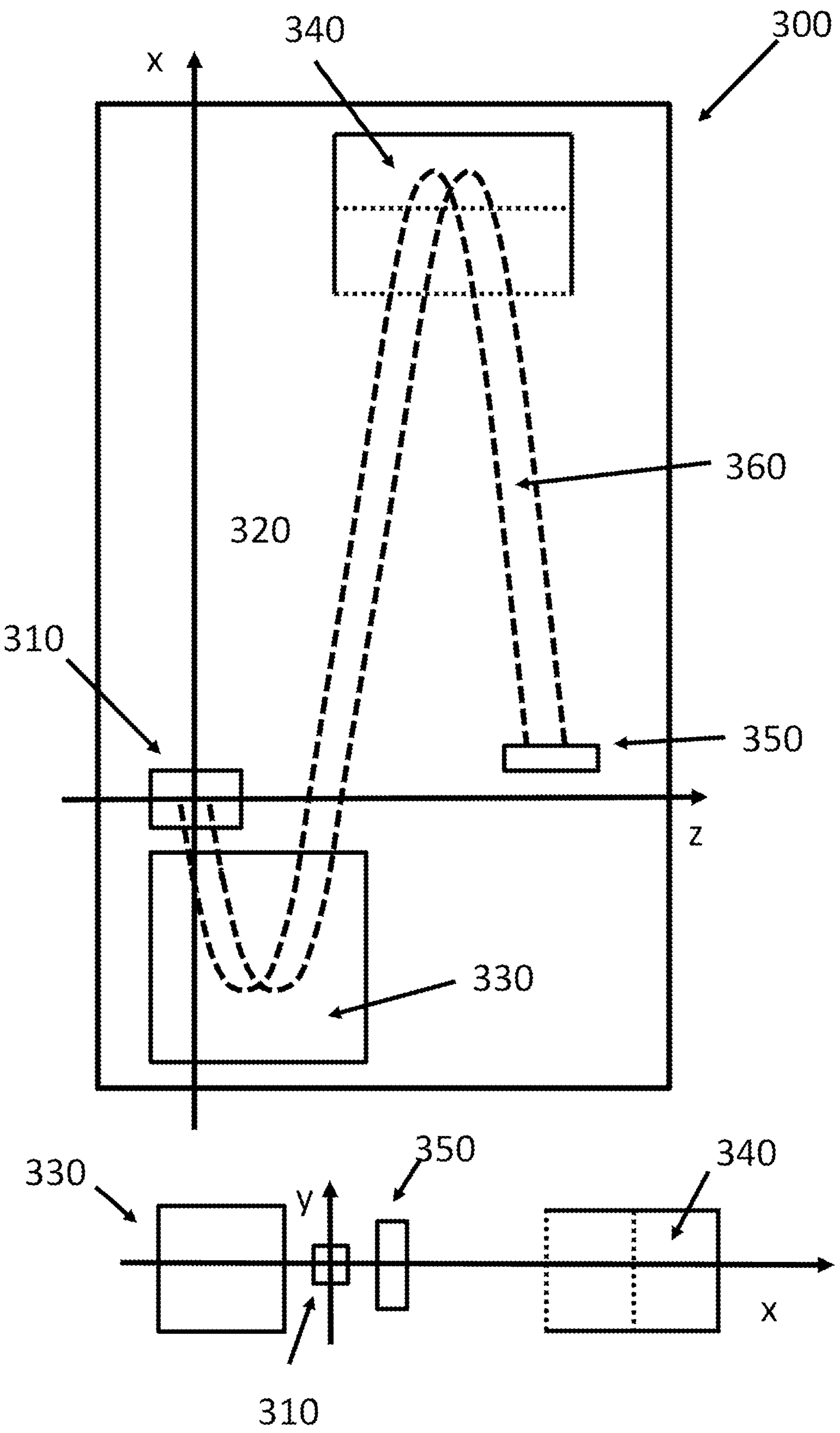
FIG. 3A shows a schematic representation of the mass-dispersive part (300) of a second embodiment, which comprises an orthogonal acceleration region (310), a two-stage grid reflector (340), an ion detector (350), and an additional reflector (330) with a two-dimensional logarithmic and octopole potential component, once in an x-z plane (top), once in an x-y plane (bottom).

FIG. 3A shows a schematic representation of the mass-dispersive part (300) of a second embodiment, which comprises an orthogonal acceleration region (310), a two-stage grid reflector (340), an ion detector (350), and an additional reflector (330) with a two-dimensional logarithmic and octopole potential component. The top part of the figure shows how the components are arranged in the x-z plane. The bottom part of the figure shows the components in the x-y plane.

As shown for the first embodiment in FIG. 2A, here too an ion beam from an upstream device (not shown) with a velocity component in the z-direction is transferred into the acceleration region (310). The acceleration region (310) periodically pulses out a string-shaped section of the ion beam orthogonally into a field-free region (320). The ions that are pulsed out are first deflected in the additional reflector (330) and pass through the field-free region (320) a second time, before their direction is reversed a second time in the two-stage grid reflector (340). After the two-stage grid reflector (340), the ions pass through the field-free region (320) a third time and are detected in the ion detector (350).

In contrast to FIG. 2A, the first field-free subregion between the acceleration region (310) and the additional reflector (330) is shorter than in FIG. 2A. In a further embodiment, the first field-free subregion can even be dispensed with completely. In addition, the ions in the acceleration region (310) are accelerated in the opposite direction to that of the acceleration region (210). The potential of the additional reflector (330) has a local minimum along the direction of reflection, i.e., the ions are first accelerated on entering the additional reflector and only decelerated afterward, and has a point of inflection after the local minimum. The potential makes it possible for the spatial spread of the ions and their divergence in the y-direction on entering and exiting to be essentially the same, or for spatial focusing or parallelization of a divergent ion beam in the y-direction to be achieved. The focusing in the additional reflector (330) can be designed such that the spatial distribution of the ions at the ion detector (350) corresponds to its dimension in the y-direction, and can replace a focusing ion lens, which is often part of an acceleration region of an OTOF-MS according to the Prior Art.

Figure 3B:
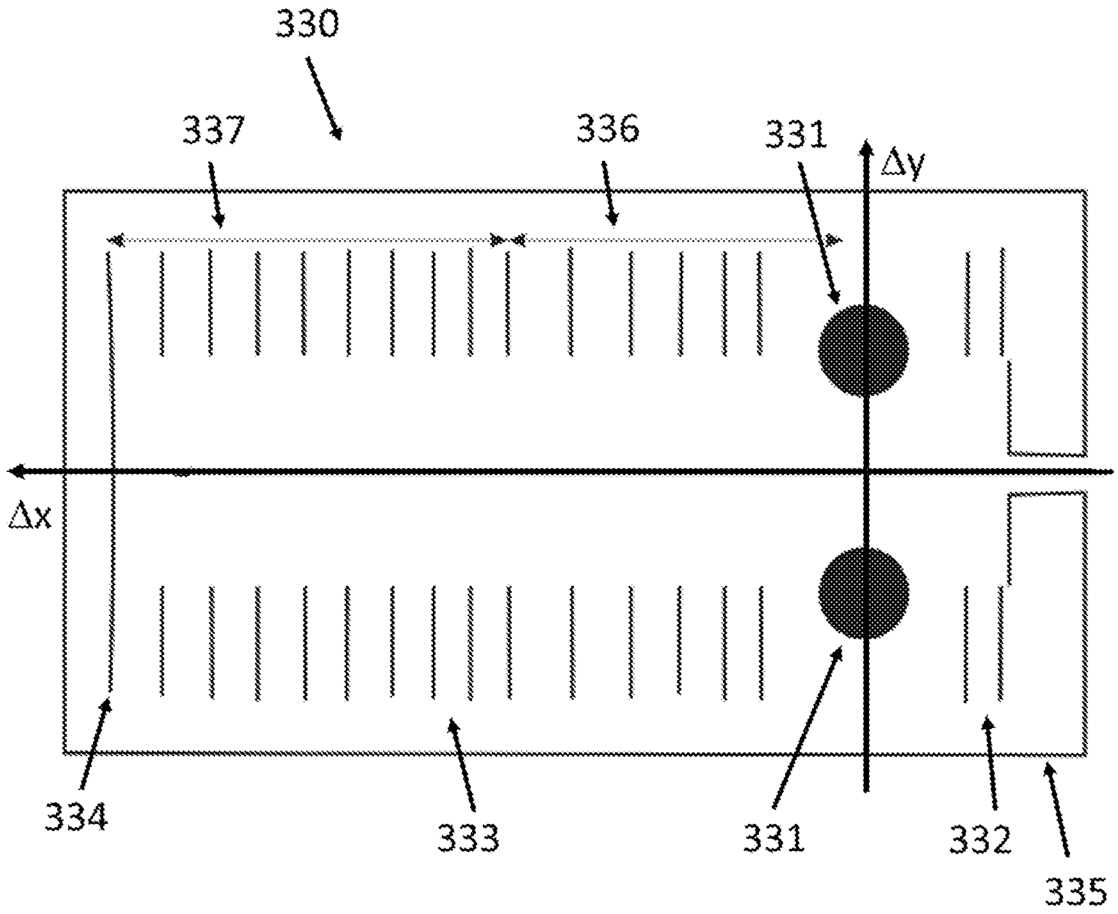
FIG. 3B shows a schematic representation of the additional reflector (330) in the x-y cross-section with the relative coordinates of the additional reflector (330).

FIG. 3B shows a schematic representation of the additional reflector (330) with a two-dimensional logarithmic and octopole potential component in the x-y cross-section with the relative coordinates of the additional reflector (330). The additional reflector (330) has two inner electrodes (331), a plurality of outer electrodes (332, 333), a terminating electrode (334), and a shielding electrode (335). The electrodes of the additional reflector (331, 332, 333, 334, 335) are arranged in mirror symmetry with respect to the x-z plane.

The additional reflector (330) shown in FIG. 3B is simplified in regard to the outer and inner electrodes, compared to the additional reflector (230) from FIG. 2B. The outer electrodes (332, 333) are flat metal sheets here. The two inner electrodes (331) have a circular cross-section and are at a potential which attracts the ions, like those in FIG. 2B.

The additional reflector (330) is bounded toward the end by a slightly curved terminating electrode (334), which is at a potential which repels the ions. The shielding electrode (335) has a slit-shaped grid-free opening along the z-direction at the entrance to the additional reflector (330), and shields the electric field of the reflector from the adjacent field-free region.

The outer electrodes (333) have a continuously increasing potential from the inner electrodes (331) through to the terminating electrode (334). The outer electrodes (332) are at a potential which attracts the ions, as are the two inner electrodes (331), but their potential attracts ions less than the potential of the two inner electrodes (331). The separations of the outer electrodes along the region (337) are chosen such that the same potential difference $\Delta U$ is always applied between the outer electrodes. Twice the potential difference $2\Delta U$ is applied between the outer electrodes along the region (336), including the inner electrode (331). The potential differences can easily be generated from a single operating voltage by means of a voltage divider with precision resistors or equivalent electric circuits. In simulations, it was possible to show that this geometrically simplified form generates a potential distribution that has the same favorable spatial and temporal focusing properties as the reflector (230) in FIG. 2B, since the slight distortion of the potentials produces only harmless higher multipole components.

Figure 4:
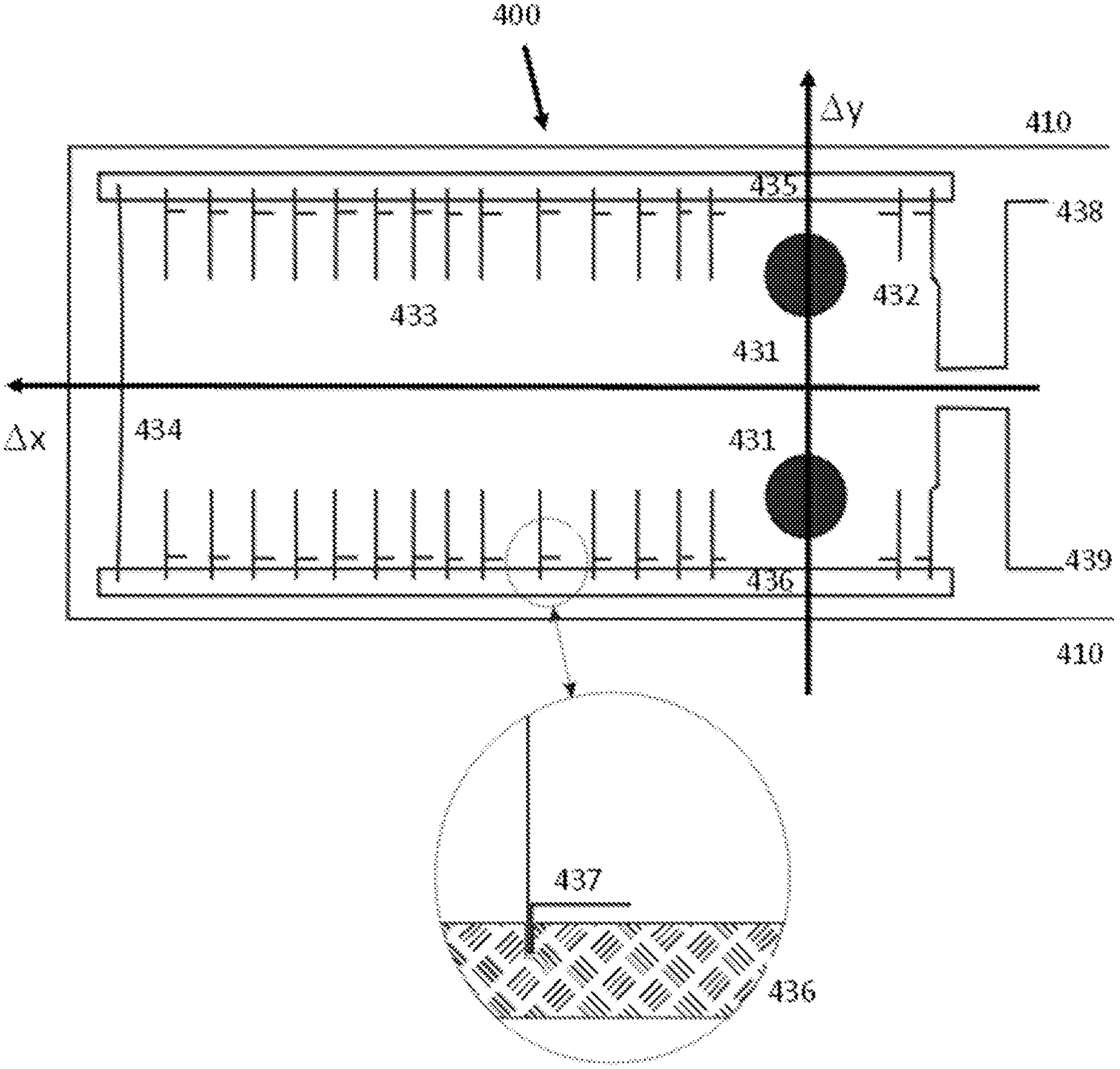
FIG. 4 shows a schematic representation of a preferred embodiment of a reflector (400) with a two-dimensional logarithmic and octopole potential component in the x-y cross-section with the relative coordinates of the additional reflector (400).

FIG. 4 shows a schematic representation of a preferred embodiment of an additional reflector (400) with a two-dimensional logarithmic and octopole potential component in the x-y cross-section with the relative coordinates of the additional reflector (400).

The additional reflector (400) has a vacuum housing (410), in which two ceramic plates (435) and (436) are secured. Flat outer electrodes (432, 433) and a slightly curved terminating electrode (434) are inserted in milled gaps in the ceramic plates (435, 436). The outer electrodes are bent once and folded over to form a small protective shield (437), to give the outer electrodes more hold in the milled gaps and to prevent leakage currents between the outer electrodes on the surface of the ceramic plates (435, 436). The protective shields (437) cover a part of the ceramic plates (435, 436) in such a way that there is no electric field along the surface under the shields, although high voltages of one to two kilovolts can be present between adjacent outer electrodes. The shielding electrodes (438) and (439) continue into an envelope of the field-free flight region and generate the constant potential which prevails there. The reflector additionally has two inner electrodes (431) with circular cross-section.

Figure 5:
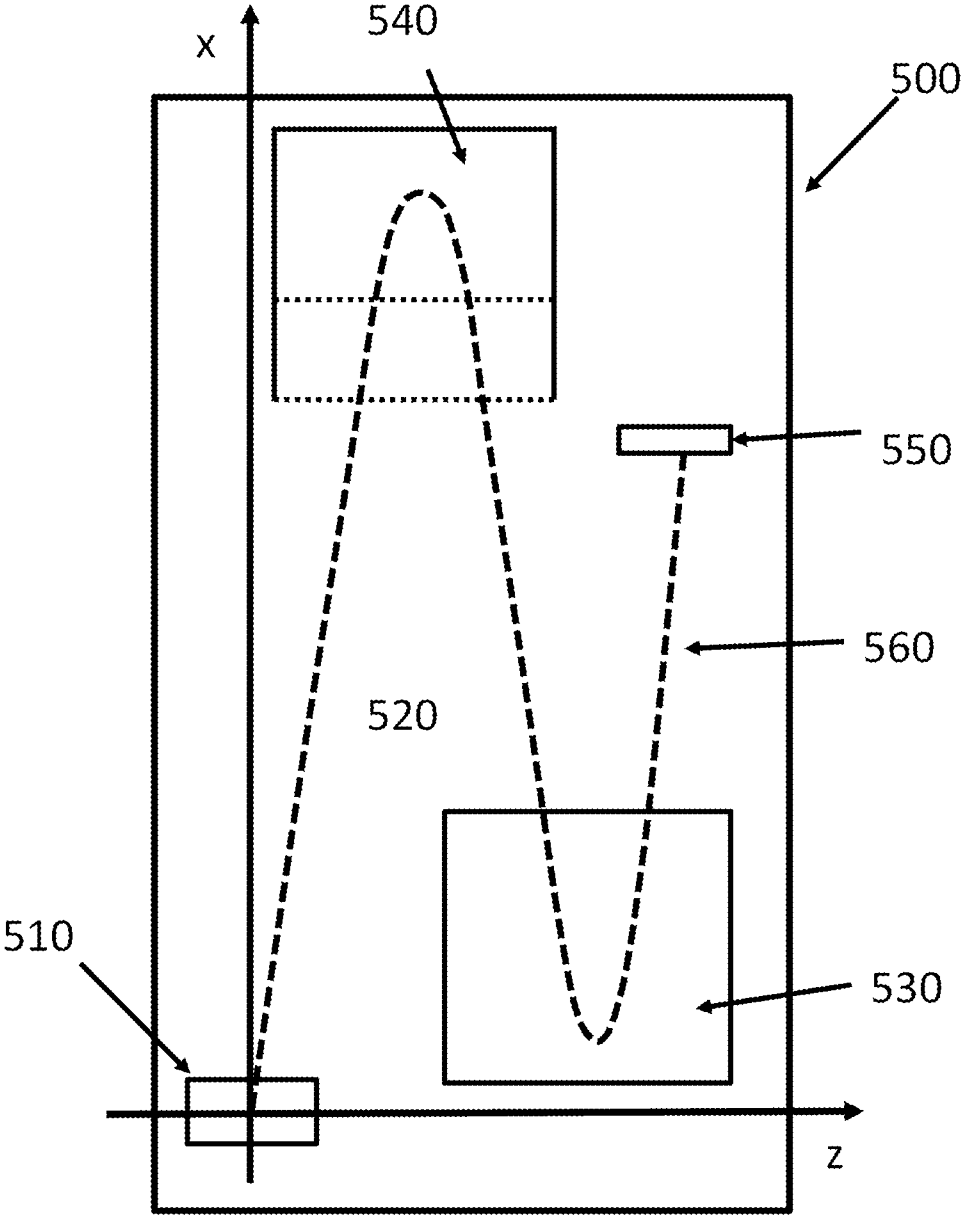
FIG. 5 shows a schematic representation of a third embodiment, which comprises an acceleration region (510) with a desorbing ion source, a two-stage grid reflector (540), an ion detector (550), and an additional reflector (530) with a two-dimensional logarithmic and octopole potential component.

FIG. 5 shows a schematic representation of a third embodiment, which comprises an acceleration region (510) with a desorbing ion source, a two-stage grid reflector (540), an ion detector (550), and an additional reflector (530) with a two-dimensional logarithmic and octopole potential component.

In contrast to the first two embodiments, the ions here are first produced in the acceleration region (510) itself, e.g., by means of a MALDI ion source or other types of desorbing ion source. The ions are accelerated in the acceleration region in the x-direction as well as in the z-direction and formed into a slightly divergent ion beam (560). A further difference compared to the first embodiment consists in the fact that, after a first field-free subregion, the ions first pass through the two-stage grid reflector (540) and only then through the additional reflector (530).

FIG. 6 shows a schematic representation of the mass-dispersive part (600) of a fourth embodiment, which comprises an orthogonal acceleration region (610), a two-stage grid reflector (640), an ion detector (650), and an additional reflector (630), which has a two-dimensional logarithmic and octopole potential component. The top part of the figure shows how the components are arranged in the x-z plane. The bottom part of the figure shows the components in the x-y plane.

An ion beam is transferred from an upstream device (not shown) with a velocity component in the z-direction into the acceleration region (610). The acceleration region (610) periodically pulses out a string-shaped section of the ion beam orthogonally into a field-free region (620). The ions that are pulsed out are first deflected in the additional reflector (630) and pass through the field-free region (620) a second time, before their direction is reversed a second time in the two-stage grid reflector (640). The additional reflector (630) is elongated in the z-direction compared to the second embodiment in FIG. 3B, and the accelerated ions pass through it twice. After their direction is reversed a second time in the additional reflector (630), the ions pass through the field-free region (620) a fourth time and are detected in the ion detector (650). Overall, an approximately W-shaped ion trajectory (660) results, which allows the dimension of the mass-dispersive part (600) in the x-direction to be reduced compared to the previous embodiments, while the overall length of the field-free flight regions stays the same.

The invention has been described above with reference to different, specific example embodiments. It is to be understood, however, that various aspects or details of the embodiments described can be modified without deviating from the scope of the invention. Furthermore, the features and measures disclosed in connection with different embodiments can be combined as desired if this appears practicable to a person skilled in the art. Moreover, the above description serves only as an illustration of the invention and not as a limitation of the scope of protection, which is exclusively defined by the appended claims, taking into account any equivalents which may possibly exist. The person skilled in the art will find it easy to develop further embodiments of a time-of-flight mass spectrometer according to the invention on the basis of the potential distributions according to the invention in the additional reflector.

The invention claimed is:

1. A time-of-flight mass spectrometer comprising:

an acceleration region;

a single-stage or multi-stage reflector;

an ion detector; and an additional reflector whose potential has, at least in a subregion, a two-dimensional logarithmic potential component and a two-dimensional octopole potential component.

2. The time-of-flight mass spectrometer according to claim 1, wherein the multi-stage reflector is a two-stage grid reflector.

3. The time-of-flight mass spectrometer according to claim 1, wherein the two-dimensional logarithmic potential component is given by:

$$U_{log}(\Delta x, \Delta y) = U_l \log\left[\frac{(\Delta x^2 + \Delta y^2)^2 - 2b^2(\Delta y^2 - \Delta x^2) + b^4}{a^4}\right]$$

where Δx and Δy are relative coordinates in the additional reflector, the Δx-direction is the direction of reflection, $U_1$ defines the strength of the logarithmic potential component of the reflector potential, and a and b are constants of the two-dimensional logarithmic potential.

4. The time-of-flight mass spectrometer according to claim 1, wherein the two-dimensional octopole potential component is given by:

$$U_{oct}(\Delta x, \Delta y) = U_o\left(\frac{\Delta x^4 - 6\Delta x^2\Delta y^2 + \Delta y^4}{r^4}\right)$$

where Δx and Δy are relative coordinates in the additional reflector, the Δx-direction is the direction of reflection, $U_o$ defines the strength of the octopole potential component of the reflector potential, and r is a constant of the octopole potential.

5. The time-of-flight mass spectrometer according to claim 1, wherein relative coordinates of the logarithmic potential component and the octopole potential component are identical.

6. The time-of-flight mass spectrometer according to claim 1, wherein the reflector potential of the additional reflector is substantially a superposition of the logarithmic potential component and the octopole potential component.

7. The time-of-flight mass spectrometer according to claim 1, wherein the additional reflector has two inner electrodes at a potential which attracts ions and a plurality of outer electrodes, where a cross-section of the inner electrodes is convex in shape, at least toward the inside of the reflector, and where the outer electrodes are arranged in a direction of reflection between the inner electrodes and a rear end of the additional reflector, and have a continuously increasing reflection potential, starting from the inner electrodes.

8. The time-of-flight mass spectrometer according to claim 1, wherein the additional reflector has a shielding electrode at its entrance, said electrode having a gridless slit-shaped opening and shielding the electric field of the additional reflector from an adjacent field-free flight region.

9. The time-of-flight mass spectrometer according to claim 1, additionally having a device which is located upstream of the acceleration region and is set up such that ions are transferred into the acceleration region perpendicularly to the direction of acceleration.

10. The time-of-flight mass spectrometer according to claim 1, wherein the acceleration region has an RF ion trap or an ion source.

11. The time-of-flight mass spectrometer according to claim 1, wherein the acceleration region, the single-stage or multi-stage reflector, the additional reflector, and the ion detector are preferably arranged and set up such that ions that are accelerated in the acceleration region only pass through the two reflectors once before being detected at the ion detector.

12. A method for operating a time-of-flight mass spectrometer, comprising:

accelerating ions in an acceleration region;

passing the ions through a first reflector after a first field-free flight region;

passing the ions through a second reflector after a second field-free flight region; and detecting the ions in an ion detector after a third field-free flight region, where one of the two reflectors is a single-stage or two-stage reflector and the other is a reflector whose potential has, at least in a subregion, a two-dimensional logarithmic potential component and a two-dimensional octopole potential component.

13. The method according to claim 12, wherein the ions pass through the reflectors only once.

* * * * *